Feb. 11, 1964 H. E. PRAVEL 3,120,761
ROTARY TO LINEAL MOTION CONVERTERS
Filed June 21, 1962 5 Sheets-Sheet 1
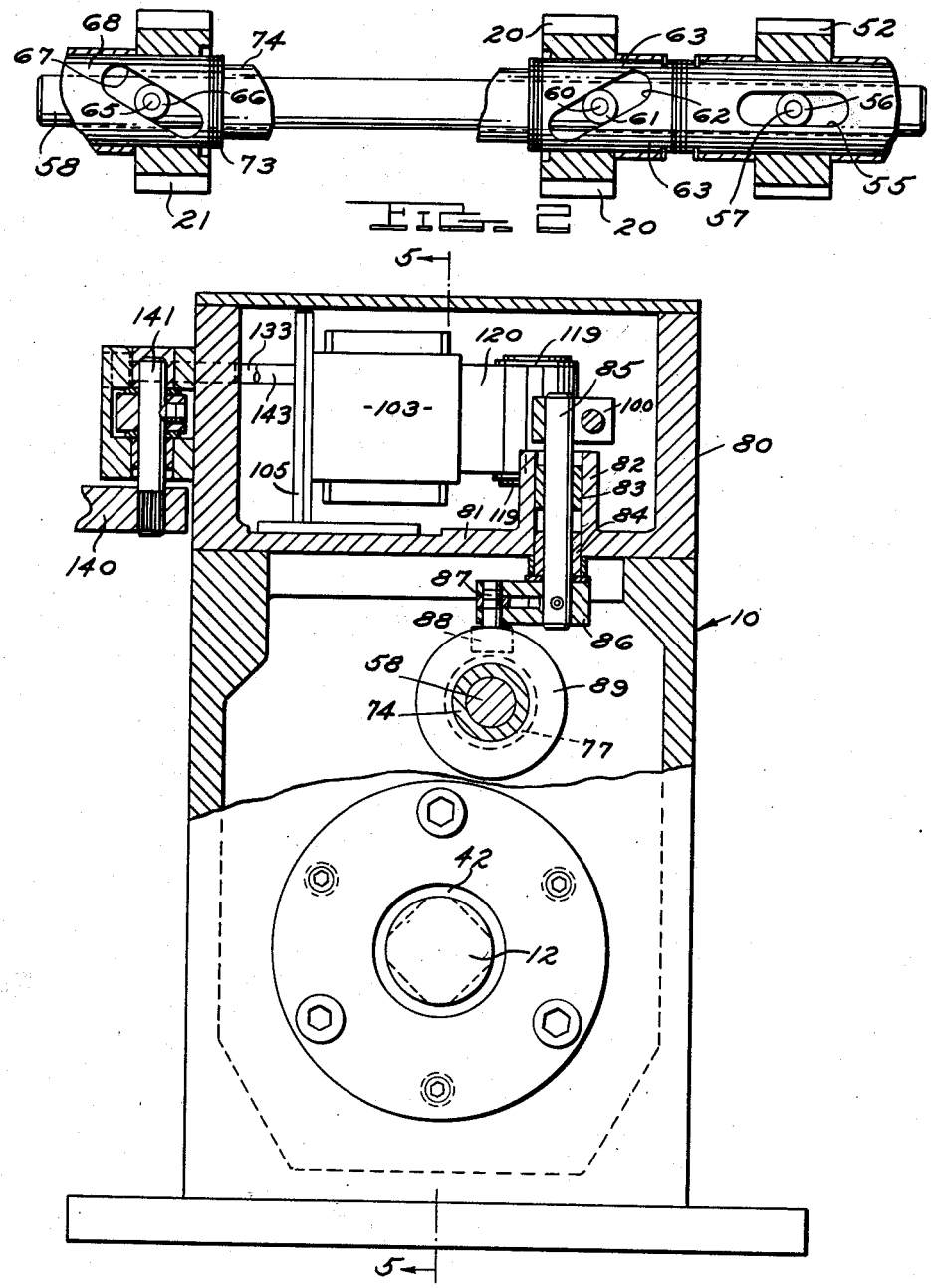
INVENTOR.
HERMAN E. PRAVEL
BY
ATTORNEY Feb. 11, 1964
H. E. PRAVEL
3,120,761
ROTARY TO LINEAL MOTION CONVERTERS
Filed June 21, 1962
5 Sheets-Sheet 2
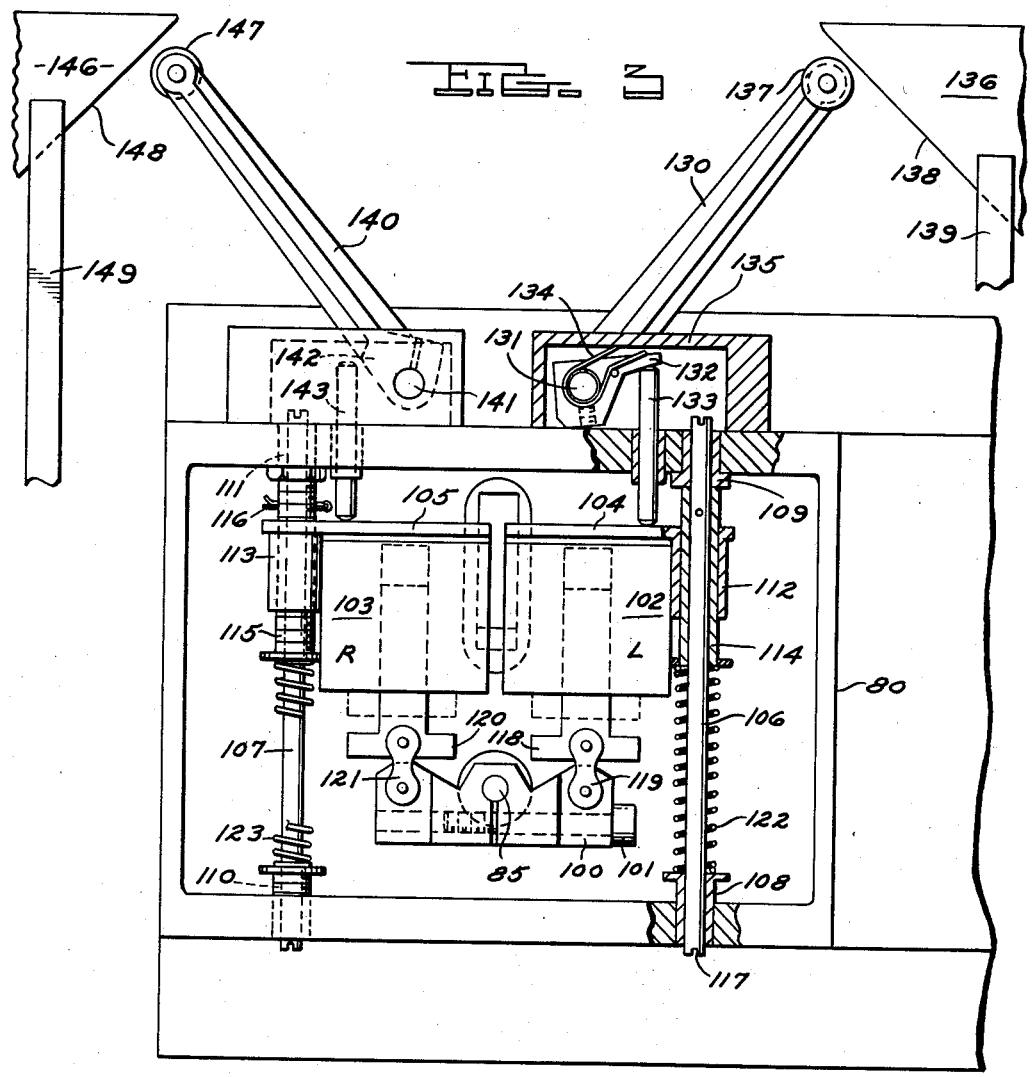
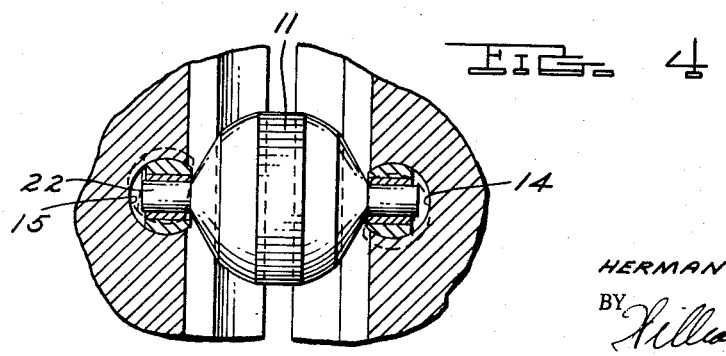
INVENTOR.
HERMAN E. PRAVEL
BY
ATTORNEY

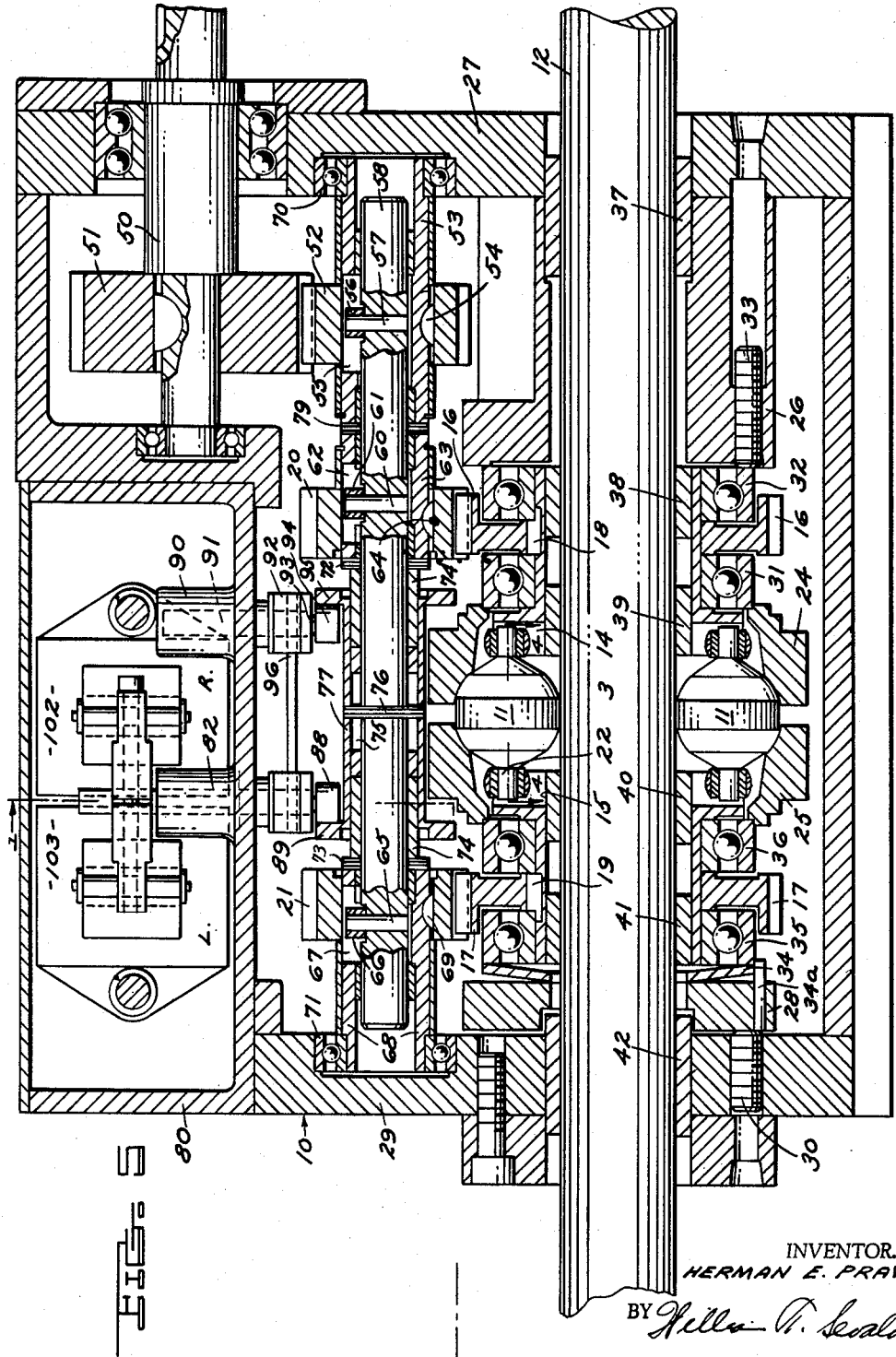

Feb. 11, 1964  H. E. PRAVEL  3,120,761
ROTARY TO LINEAL MOTION CONVERTERS
Filed June 21, 1962  5 Sheets-Sheet 4

INVENTOR.
HERMAN E. PRAVEL
BY
ATTORNEY

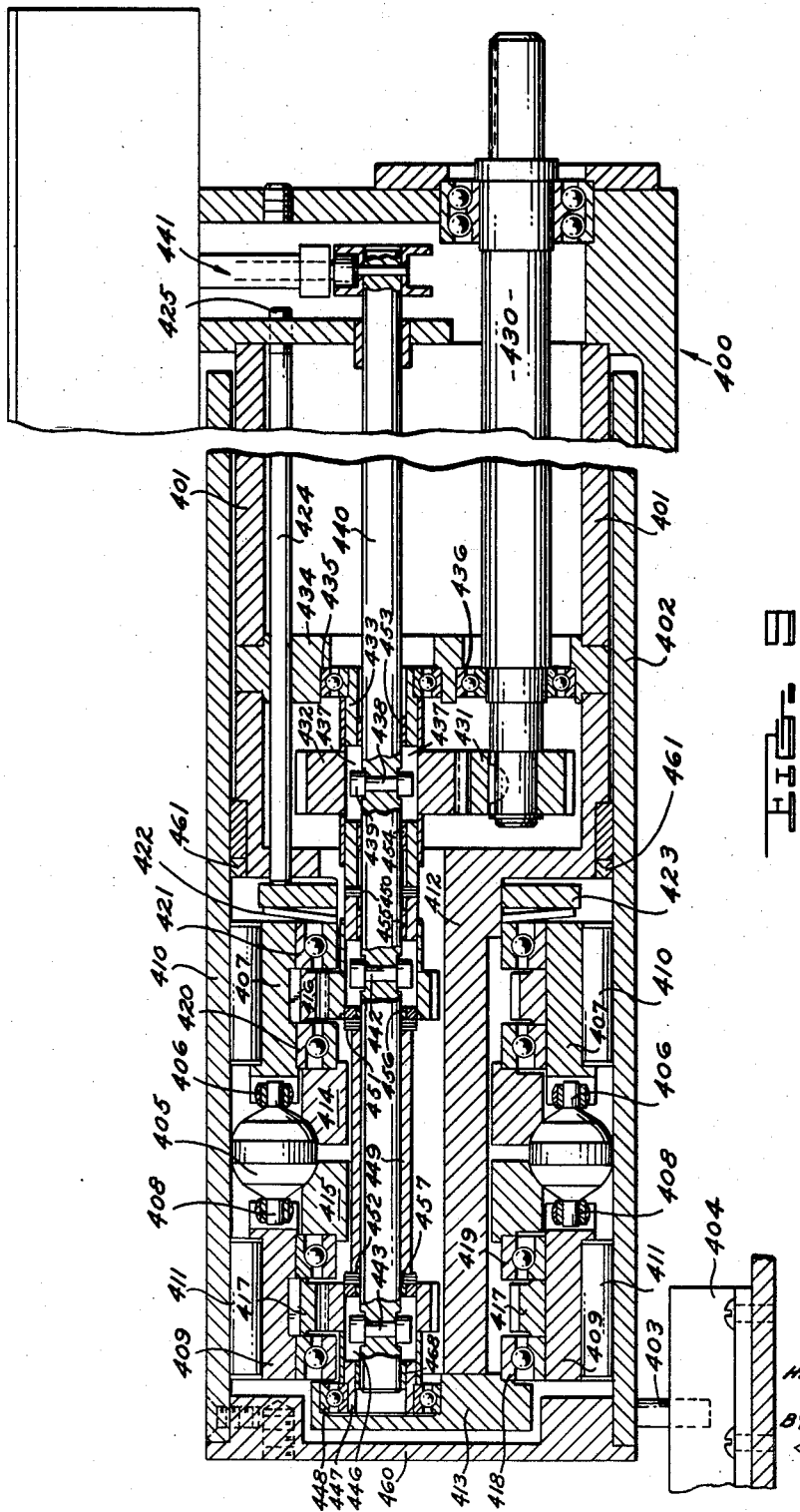

United States Patent Office 3,120,761
Patented Feb. 11, 1964

3,120,761
ROTARY TO LINEAL MOTION CONVERTERS
Herman E. Pravel, Birmingham, Mich.
(120 Mohawk Road, Schenectady, N.Y.)
Filed June 21, 1962, Ser. No. 204,275
19 Claims. (Cl. 74—25)

This invention relates to rotary to lineal motion converters having a mechanically moved thrust member and means for selectively varying the force, direction, and amplitude of thrust member lineal movement. This application is a continuation in part of my co-pending application Serial No. 108,457, filed May 8, 1961, now Patent Number 3,046,800, and a continuation in part of my co-pending application Serial No. 128,094, filed July 31, 1961, now Patent Number 3,046,801.

Bi-directionally moved members have been employed heretofore such as in hydraulic and pneumatic systems for moving a member axially to effect desired action in other devices, however, the several devices of the prior art have not proven entirely satisfactory inasmuch as they are complicated in design and construction, expensive to manufacture, difficult to use, difficult to maintain in satisfactory use condition, limited in axial projection, and cumbersome in that they require much additional equipment such as fluids, tanks, pumps, pressure chamber, reservoirs, seals, lines, etc.

With the foregoing in view, the primary object of the invention is to provide devices having a mechanically actuated thrust member which is selectively movable in opposite lineal directions at variable rates and forces of movement which are simple in design and construction, inexpensive to manufacture, easy to use, easy to maintain in operative condition, comparatively unlimited in axial projection, and which do not require any auxiliary cumbersome and expensive equipment.

An object of the invention is to provide a case having a rotationally secured axially movable member such as a tubular sleeve or a thrust shaft wherein balls or rollers planetwise rotating about the member in frictional engagement therewith are controlled in their applied helix angle relative to the member to effect desired axial movement in the member.

An object of the invention is to provide radial projections on the balls or rollers lying in planetary races travelling with the balls or rollers.

An object of the invention is to provide a diametrical extension or pin in the balls having extending ends lying in planetary races travelling with the balls.

An object of the invention is to provide means for angularly moving at least one race angularly relative to the other to move the balls or rollers to a helical angle relative to the member to effect desired axial movement and thrust in the member.

An object of the invention is to provide cam rings or thrust collars bearing on the balls or rollers associated with means for adjustably forcing the cam rings axially relative to the balls or rollers to effect radially forced frictional engagement between the balls or rollers and the member.

An object of the invention is to provide a gear on the cam rings for rotationally driving the cam rings and planetwise rotating the balls relative to the thrust member.

An object of the invention is to provide helical teeth on the gear on each race having opposed helix angles meshing with helical driving gears having mating teeth fixed on a common shaft or sleeve so that by axially moving the shaft gears relative to the race helical gears, one helical race gear is moved angularly forwardly angularly moving its respective race and the other race gear angularly rearwardly angularly moving its respective race to control and change the applied helix angle of the balls or rollers relative to the thrust member by race contact with the radial projections on the balls or rollers.

An object of the invention is to provide at least one helical gear on one race meshing with a helical idler gear having mating teeth so that by axially moving the idler gear relative to the race helical gear, one is moved angularly relative to the other to control and change the applied helix angle of the balls relative to the axial thrust member.

An object of the invention is to utilize the traction between the rollers and the member to lock the shaft axially stationary when the helix angle of the ball or roller line of contact is zero under rotational conditions and also lock when there is no relative movement between the parts regardless of helix angle to eliminate axial drifting or creeping of the thrust member.

An object of the invention is to provide means for selectively varying the angle of the balls or rollers individual axis from zero helix angle to an angle on either side of zero relative to the thrust member axis to effect relative axial movement of the thrust member in either axial direction in conjunction with uni-directional rotational ball or roller movement.

An object of the invention is to provide a spur gear on each race meshing with spur driving gears with at least one driving gear being advanceable in either angular direction relative to the other drive gear to angularly advance at least one race in either angular direction relative to the other race to vary the helix angle of the balls or rollers relative to the thrust member in either helical direction.

An object of the invention is to provide a spur gear on each race meshing with spur driving gears with each driving gear being advanceable angularly oppositely relative to the other spur gear in either angular direction to angularly oppositely advance each race relative to the other race to vary the helix angle of the balls or rollers relative to the member in either helical direction.

An object of the invention is to provide means for angularly advancing one spur gear angularly relative to the other.

An object of the invention is to provide adjustable means for applying axial pressure to the cam rings or thrust collars to vary the radial pressure of the balls or rollers against the thrust member.

An object of the invention is to provide a drive and/or control shaft and at least one sleeve surrounding and rotating with the shaft with one being movable axially to the other.

An object of the invention is to provide a helical slot in the control shaft or sleeve and a key on the other control shaft or sleeve travelling in the slot so that upon relative axial movement between the control shaft and sleeve they move angularly relative to one another.

An object of the invention is to mount a spur gear on each said sleeve for moving angularly with said sleeve relative to said shaft.

An object of the invention is to provide paired sleeves on the control and/or drive shaft and paired control and/or drive gears on the sleeves with oppositely angled helical slots between the sleeves and shafts so that upon relative axial movement between the sleeves and shaft one gear moves in one angular direction and the other gear moves in the opposite angular direction.

An object of the invention is to connect the opposite angular movement of the gears to the internal or external spur gears on the ball races so that gear relative angular movement is transmitted to the races and the extensions on either side of the balls or rollers to change and control the helical angle of the balls or rollers relative to the thrust member.

An object of the invention is to provide control means for moving the shaft and at least one sleeve axially relative to one another.

An object of the invention is to provide at least one lever for moving the drive shaft axially relative to at least one sleeve.

An object of the invention is to provide a solenoid for actuating the lever moving the drive shaft axially.

An object of the invention is to provide a spring mounted support for the solenoid so that upon energizing the solenoid it moves against and compresses the spring immediately without necessarily immediately actuating the lever.

An object of the invention is to provide a solenoid loaded spring to actuate the lever through the solenoid by a resilient force commensurate with the rate of movement of the parts and mechanism actuated by the lever.

An object of the invention is to provide a deactivating lever for compressing the spring to offset the solenoid actuated position to neutralize or partially neutralize the solenoid travel while actuated to gain supplemental control of the mechanism.

These and other objects of the invention will become apparent by reference to the following description of rotary to lineal motion converters having mechanically actuated thrust members which are bi-directionally selectively operated as to amplitude, force, and direction of movement embodying the invention taken in connection with the accompanying drawings in which:

FIG. 1 is an end elevational view of a device embodying the invention, partly in cross-section, showing the drive shaft, sleeve, and control mechanism.

FIG. 2 is a side elevational view, partly in cross-section, of the drive shaft, sleeves, and gears of the device seen in FIG. 1.

FIG. 3 is a top plan view of FIG. 1 with the cover plate removed showing the control mechanism.

FIG. 4 is a fragmentary enlarged cross-sectional view of a roller-ball, races, and cam rings as seen in FIG. 5.

FIG. 5 is a cross-sectional view of FIG. 1, taken on the line 5—5 thereof.

FIG. 9 is a longitudinal cross-sectional view of a device having an outer axially moving member and an inner rotational member.

Figure 6:
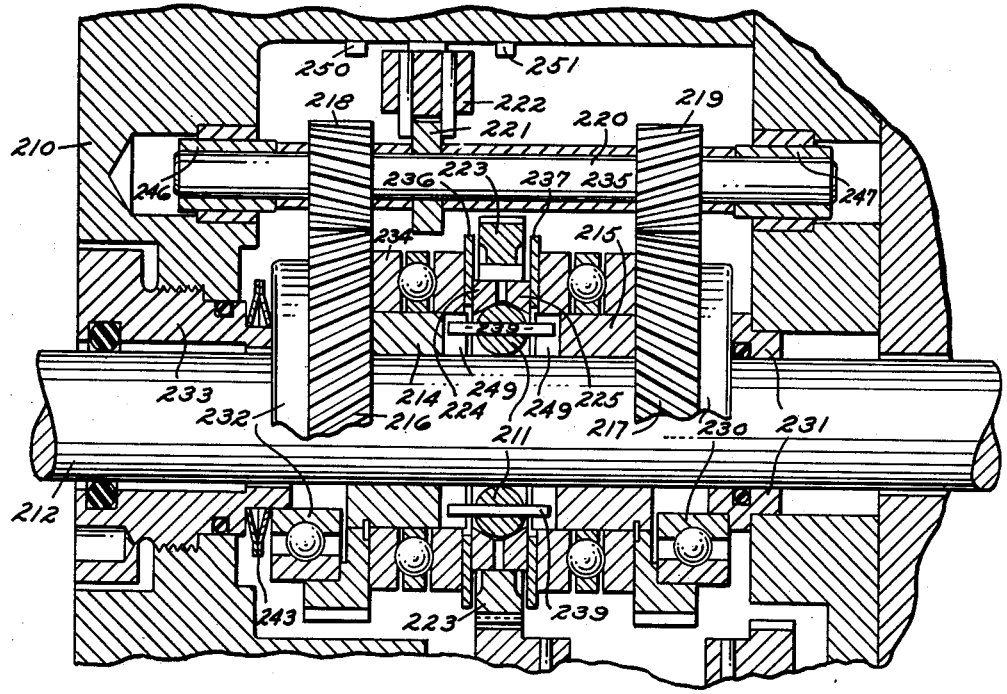
FIG. 6 is an longitudinal cross-sectional view of a modified embodiment of the invention.

Referring now to the drawings, a device disclosed therein to illustrate an embodiment of the invention, FIGS. 1–5, comprises a case 10 enclosing a plurality of planet rollers or balls 11 frictionally contacting a thrust shaft 12 to move the shaft axially in either direction depending on the helix angle between the balls 11 and the thrust shaft 12. The balls 11 are equipped with axial extensions or tips 22 which lie in the recesses of races 14 and 15 which surround the shaft 12.

The helix angle of the balls 11 relative to the thrust shaft 12 is controlled by the relative angular position of their tips 22 in races 14 and 15. The races relative angular position is controlled by the relative angular position of gears 16 and 17 which are keyed to the races by keys 18 and 19 respectively. The gears 16 and 17 are rotationally driven by drive gears 20 and 21 respectively. Angular movement of one drive gear 20 or 21 relative to the other produces an angular movement between the gears 16 and 17 relative to one another.

The movement of the gears 16 and 17 relative to one another angularly advances and/or retracts one race 14—15 relative to the other. Angular movement between the races 14 and 15 moves the tips 22 of the balls 11 and changes the axis of the balls relative to the thrust shaft 12. This changes the helix angle of the balls 11 relative to the thrust shaft 12 from a zero helix angle to helix angles on either side of zero.

Paired cam rings or thrust collars 24 and 25 bear on the balls 11 and urge them radially inwardly into forced frictional contact with the thrust shaft 12. Inward radial thrust is exerted by the cam rings 24 and 25 against the balls 11 by urging the cam rings 24 and 25 axially toward one another and the balls 11. The cam surfaces on the balls and rings convert the axial thrust of the rings to radial thrust in the balls.

Axial thrust on the cam rings 24 and 25 is developed between a rotationally stationary axially anchored collar 26 which abuts an end 27 of the case 10 on one side and a rotationally stationary axially adjustably movable collar 28 on the other side at an opposite end wall 29 of the case 10. A plurality of thrust screws 30 threaded in the case end wall 29 urges the collar 28 axially towards the collar 26. Three thrust screws 30 may be used.

The cam ring 24 is held axially by abutment against a ball bearing assembly 31 which transfers thrust to the gear 16. The gear 16 transfers thrust through a ball bearing assembly 32 to the axially stationary collar 26. A plurality of adjusting thrust screws 33 may be located in the collar 26 to variously adjust reaction pressure against the axially stationary race of the bearing assembly 32.

Axial thrust is supplied normally by the axially movable collar 28 through a Belleville spring washer 34 which thrusts against a bearing assembly 35. The bearing assembly 35 thrusts against the gear 17 which in turn thrusts against a bearing assembly 36. The bearing assembly 36 thrusts against the cam ring 25. Pins 34a may extend from the collar 28 and contact the spring washer 34 to hold it in concentric alignment.

By turning the adjusting screws 30 inwardly axial thrust is developed on the cam rings 24 and 25 through the mechanism just described so that they are urged toward one another with their cam surfaces in contact with the cam surfaces on the balls 11. This axial thrust is converted by the contacting cam surfaces of the rings and balls into radial thrust urging the balls 11 radially inwardly into forced friction contact with the thrust shaft 12.

The gears 16 and 17, the races 14 and 15, and the balls 11 rotate at the speed at which the balls 11 orbit around the shaft 12. The cam rings 24 and 25 rotate at the peripheral speed of the balls 11 and this difference in rotational speed between the cam rings 24 and 25 and the races 14 and 15 is permitted by the bearing assemblies 31 and 36. The difference between the rotational speed of the gear 16 and the stationary collar 26 is permitted by the bearing assembly 32. The difference in rotational speed between the gear 17 and the race 15 combination relative to the stationary pressure collar 28 is permitted by the bearing assembly 35. The bearing assemblies permit relative rotation between the parts as well as transfer the axial thrust between the parts.

Spacer sleeve bearings 37, 38, 39, 40, 41, and 42 may lie between the thrust shaft 12 and the parts adjacent to the spacer sleeves to locate the various parts in radial alignment and to locate the thrust shaft 12 in radial alignment.

Referring now to the drive means, a shaft 50 rotates a gear 51 meshing with a gear 52 which is keyed to a sleeve 53 by a key 54. The sleeve 53 has a longitudinal slot 55 housing a roller 56 carried on the end of a pin 57 which is fixed in a drive shaft 58. A motor, not shown, drives the shaft 50 which rotates the drive shaft 58 through gears 51 and 52, key 54, sleeve 53, roller 56, and pin 57. The shaft 58 may move axially of the sleeve 53 with the pin 57 and roller 56 travelling in the longitudinal slot 55.

The rotation of the drive shaft 58 is communicated to the gear 20 through a pin 60 fixed in the shaft 58 having an extending end carrying a roller 61 lying in a helical slot 62 formed in a sleeve 63 keyed to the gear 20 by a key 64.

Rotation of the drive shaft 58 is transmitted to the gear 21 via a pin 65 carried by the shaft 58 having a projecting end supporting a roller 66 in the helical slot 67 of a sleeve 68 keyed to the gear 21 by a key 69.

The angulation of the helical slot 67 is opposite to the angulation of the helical slot 62.

The sleeve 53 at the gear 52 is rotationally supported and axially abutted by a bearing assembly 70 in the case end wall 27. The sleeve 68 is axially abutted and rotationally supported by a bearing assembly 71 in the case end wall 29. Discular anti-friction washers 72, 73, and 79 are disposed at the gears 20 and 21 and sleeves 53 and 68 respectively. A sleeve 74 surrounds the shaft 58 and extends between the anti-friction washers 72 and 73. The sleeve 53 abuts a sleeve 63. Anti-friction washers 79 lie between sleeves 53 and 63. The sleeves 53, 63, 68, and 74 abut one another and cannot move axially. The gears 20 and 21 cannot move axially. The sleeve 74 has paired longitudinal slots 75 formed therein. A pin 76 is fixed in the drive shaft 58 and extends through the paired slots 75 in the sleeve 74. The ends of the pin 76 are fixed in a spool 77 surrounding the sleeve 74.

Moving the spool 77 and the pin 76 axially is permitted by the slots 75 in the sleeve 74. Axial movement of the spool 77 and pin 76 moves the drive shaft 58 axially. Axial movement of the drive shaft 58 carries the pins 60 and 65 and the roller 61 and 66 thereon respectively axially relative to the oppositely angled helical slots 62 and 67.

Axial movement of the rollers 61 and 66 relative to the oppositely angled helical slots 62 and 67 respectively in one direction such as to the right as seen in the drawings causes the sleeve 63 and the gear 20 thereon to move angularly in one direction and the sleeve and the gear 21 thereon to move angularly in the opposite direction.

Conversely, axial movement of the spool 77, pin 76, and drive shaft 58 in the opposite direction such as to the left as seen in the drawings moves the pins 60 and 65 and rollers 61 and 66 respectively thereon in the opposite axial direction relative to the oppositely angled helical slots 62 and 57. This causes the sleeve 68 and gear 21 thereon to move angularly in one direction which is in a direction reversed to that previously described relative to gear 21. This also causes the sleeve 63 and the gear 20 thereon to move in an angular direction opposite to the angular movement of the gear 21 just described. This relative angular movement between the gears 20 and 21 is communicated to the balls 11 through the gears 16 and 17 and races 14 and 15 and the ball tips 22 to change their helix angle relative to the shaft 12.

More particularly, the axial movement of the spool 77 to the left is transferred to the drive shaft 58 via the pin 76. This axial movement of the drive shaft 58 to the left moves the pins 60 and 65 and the rollers 62 and 66 thereon respectively axially relative to the helical slots 62 and 67. As the helical slots 62 and 67 are oppositely disposed and lie respectively in the sleeves 63 and 68, FIGS. 2 and 5, the sleeves are cammed angularly in opposite directions.

This moves the gears 20 and 21 on the sleeves 63 and 68 respectively angularly in opposite directions. The opposite angular movement of the gears 20 and 21 are respectively communicated to the gear 16 and race 14 on the one hand and to the gear 17 and race 15 on the other hand causing them to move angularly in opposite directions.

The opposite angular movement of the races 14 and 15 carries the axial extensions or tips 22 of the balls 11 in opposite angular directions causing the balls 11 to move to a helical angle to the right greater than zero degree relative to the thrust shaft 12 causing the thrust shaft 12 to move to the left.

It is to be understood that the just described action takes place when the shaft 50, gear 52, axial slot 57, roller 56, and pin 57 are rotationally driving the drive shaft 58. The rotational drive of the drive shaft 58 is imparted to the balls 11 as previously described.

When the drive shaft 58 is moved to the right, FIGS. 5 and 2, the rollers 61 and 66 move to the right in the helical slots 62 and 67 respectively. This causes the sleeves 63 and 68 to move angularly in opposite directions and also the gears 20 and 21 thereon move in opposite angular directions respectively. This opposite angular movement is transmitted to the gears 16 and 17 which in turn transmit their opposite angular movement to the races 14 and 15 which carry the ball extensions 22 in opposite directions causing the balls 11 to move to a helical angle to the left as seen in FIG. 5. The reaction between the balls 11 in this helical angular position causes the thrust shaft 12 to move to the right in conjunction with the balls orbiting around the shaft 12.

With the helical slots 62 and 67 as shown, axially left movement in the drive shaft 58 causes left axial movement in the thrust shaft 12; right movement of the drive shaft 58 causes right movement of the thrust shaft 12.

The shaft 58 may be moved directly axially in either direction manually or indirectly through simple linkage or a lever. However, it is preferred that means be provided and used which are capable of integration in an automatic system. The shaft 58 may be moved axially by any means such as a reversing torque motor, a servomechanism, solenoids, etc.

Referring now to suitable automatic actuating mechanism for moving the shaft 58 axially by moving the spool 77 axially, a housing 80 fits on the case 10 and has a bottom wall 81 supporting a hub portion 82 holding bearings 83 and 84 which rotatably support a pivot pin 85. The bottom end of the pivot pin 85 has a crank arm 86 fixed thereon. The outer end of the crank arm 86 supports a pin 87 which carries a roller 88 in contact with a flange 89 on the spool 77.

The housing 80 bottom wall has a second hub 90 supporting a rod 91 which carries a like crank arm 92 thereon supporting a pin 93 at its outer end and a like roller 94 in contact with a flange 95 on the spool 77. A tie-rod 96 interconnects the crank arms pins 87 and 93 and this interconnects the crank arms 86 and 92 with one another. This causes the crank arms 86 and 92 to swing together.

Pivotal movement of the pivot pin 85 is directly communicated to swing the crank arm 86 and indirectly communicated to swing the crank arm 92 by the tie-rod 96. Pivotal movement of the pivot pin 85 in one angular direction thereby moves the spool 77 in one axial direction. Pivotal movement of the pivot pin 85 in the opposite angular direction moves the spool 77 in the opposite axial direction.

As the rollers 88 and 94 on the crank arm urge opposite flanges 89 and 95 on the spool 77 in opposite directions axially, the pivotal position of the pivot pin 85 determines the axial position of the spool 77.

Pivotal movement is imparted to the pivot pin 85 by a crosshead 100 which is clamped thereon as by a bolt 101. The pivotal position of the pivot pin 85 is controlled by the angular position of the crosshead 100.

Referring now to the crosshead 100 actuating mechanism, paired solenoid coils 102 and 103 are fixed on separate paired plates 104 and 105 respectively. The plates 104 and 105 are respectively suspended to move with paired slide rods 106 and 107 as hereafter set forth. The slide rod 106 is axially slidably positioned relative to the housing 80 bearings 108 and 109 in the housing 80 sidewalls. The slide rod 107 is axially slidably positioned in the housing sidewalls by bearings 110 and 111. The plates 104 and 105 are equipped with internally threaded sleeves 112 and 113 respectively. The bushings 114 and 115 are threaded in the sleeves 112 and 113 respectively and keyed to the slide rods 106 and 107 respectively by cotter pins 116. Thus, the plates 104 and 105 are suspended on the slide rods 106 and 107 for sliding movement therewith.

The ends of the slide pins 106 and 107 are equipped with tool engaging means such as a screw driver slot 117. By rotating the slide pin 106, for example, with a screw driver in the slot 117, the slide pin 106 and bushing 114 turns relative to the threaded sleeve 112 on the plate 104. It bears and reacts against the bearing 109. By turning the slide pin 107 with a screw driver, the bushing 115 rotates relative to the threaded sleeve 113 on the plate 105 and bears against the bearing 111. This allows adjusting the position of the plates 104 and 105 axially of the slide pins 106 and 107 respectively. This facilitates adjusting the position, spacing, and travel between the solenoid coils 102 and 103 and their armatures (singly and in combination) as the coils are on the plates 104 and 105 respectively.

A solenoid armature 118 is disposed in the solenoid coil 102 and is connected to the crosshead 100 by links 119. A solenoid armature 120 is disposed in the solenoid coil 103 and is connected to the opposite end of the crosshead 100 by links 121.

By adjusting the longitudinal position of the plates 104 and 105 relative to the slide rods 106 and 107, the relative position of the solenoid coils 102 and 103 is adjusted relative to the solenoid armatures 118 and 120 respectively. In this way the axial travel of the solenoid armatures 118 and 120 is adjustable relative to their respective solenoid coils 102 and 103.

A spring 122 surrounds the slide rod 106 and abuts the bushing 114 and the bearing 108. A spring 123 surrounds the slide rod 107 and abuts the bushing 115 and the bearing 110. These springs 122 and 123 urge the bushings, slide rods, sleeves, plates 104 and 105, and the solenoid coils 102 and 103 carried on the plates 104 and 105 outwardly relative to the armatures 118 and 120.

Upon a coil 102 or 103 being energized, it exerts an inward pull force on its respective armature 118 and 120. The energizing of the solenoid coils is substantially instantaneous and the reaction movement of the armature is also substantially instantaneous. This instantaneous movement is absorbed by compressing a spring 122 or 123 and allowing the energized solenoid coil 102 or 103 to travel initially towards the armature. Upon one coil 102 or 103 moving towards its armature 118 or 120 when energized, the spring 122 or 123 absorbs the movement and urges both the energized coil and its armature in the opposite direction.

For example, upon energizing solenoid coil 102 it moves substantially immediately relative to its armature 118 and carries along the plate 104 and bushing 114. This compresses the spring 122. With continued energization of the solenoid coil 102, the outward spring pressure on the coil 102 is transmitted through the armature 118 and pulls against the links 119 angularly turning the crosshead 100 and pivoting the pivot pin 85.

Pivotal action of the pivot pin 85 is transferred to swing the arm 86, pin 87, and roller 88. In this direction of movement the roller 88 moves to the left against the flange 89 on the spool 77, FIG. 5. This moves the spool 77 axially to the left, seen in FIG. 5.

It requires a small period of time for the various elements in the mechanism and linkage to move. This movement extends from the solenoids to the balls 11 at the thrust shaft 12 through the entire mechanism and linkage of the device. It also takes a constantly applied pressure in the desired direction to effect the movement through the linkage and mechanism to the balls 11. This period of time and the constantly applied pressure is allowed and effected by the spring 122 which continually applies force against the mechanism until the balls have been moved as desired.

Relative to movement in the opposite direction, upon energizing the solenoid coil 103 it initially moves from its solid line position to a position adjacent the solid line position of the armature 120. The coil 102 carries with it the plate 105 and bushing 115 against the spring 123. This compresses the spring 123. The spring 123 under its load moves the coil 103 back to its solid line position and the energized coil 103 carries the armature 120 with it from its solid line position to its indicated dotted line position. Ths swings the crosshead 100 by the connecting link 121 causing the pivot pin 85 to pivot.

The pivotal movement of the pivot pin 85 is transferred to swing the arm 86. The swinging movement of the arm 86 is transferred to the arm 92 via the connecting rod 96. This causes the arm 92 to pivot carrying with it the pin 93 and roller 94 thereon to the right aginst the flange 95 on the spool 77, FIG. 5. This causes the spool 77 to move axially to the right and its connecting pin 76 moves the drive shaft 58 to the right as seen in FIG. 5.

Solenoid coil 102 moves spool 77 to the left resulting in thrust shaft 12 moving axially to the left. The letter "L" on the coil 102 has this significance.

Solenoid coil 103 moves spool 77 to the right resulting in thrust shaft 12 moving axially to the right. The letter "R" on the coil 103 has this significance.

The travel of the energized solenoids as moved by the springs constitutes the maximum actuating movement. This travel may be adjusted by turning the slide rods 106 and 107 as previously explained.

The adjusted maximum travel of the energized solenoids may be such to angularly swing the crosshead 100, pivot the pivot pin 85, swing the arms 86 and 92; and move the spool 77 and drive shaft 58 axially a sufficient distance to move the rollers 61 and 66 carried by the drive shaft 58 a full axial travel relative to the helical slots 62 and 67 in the sleeves 63 and 68 respectively. This causes the maximum helically angular movement of the balls 11 as previously explained. This causes the thrust shaft 11 to move axially at its maximum speed in either axial direction at a given orbital speed of the balls 11.

However, there may be times and locations when and/or where maximum speed may not be suitable and a lesser speed by desirable. This may be at a relative position where the thrust shaft 12 approaches the end of its travel relative to the case 10.

Accordingly, reference is now made to means for partially and/or fully neutralizing the effect of the full travel of an energized solenoid on the drive mechanism to reduce speed of axial travel and/or terminate axial travel of the thrust shaft.

If the crosshead 100 is not pivoted by the full stroke of the solenoid, the spool 77 and drive shaft 58 will not move the rollers 61 and 66 a full travel relative to the helical slots 62 and 67 respectively. This reduces the angular movement of the sleeves 62 and 67 so that the races 14 and 15 will not move their full angular movement relative to one another thereby disposing the balls 11 at a lesser helical angle and thereby moving the shaft 12 at a lesser axial speed.

The means to accomplish slowing down the speed of axial travel and/or to terminate its axial travel of the thrust shaft 12 comprises, a lever arm 130 pivotally mounted on the housing 80 on a hinge pin 131. The lever arm 130 is equipped with a boss 132 engaging a thrust pin 133 which bears against the plate 104 supporting the solenoid coil 102. A light spring 134 is disposed between a housing wall 135 and the boss 132 to lightly resiliently urge the boss 132 against the thrust pin 133 and to thereby properly position the arm 130. A cam 136 may be positioned so as to engage the roller 137 on the end of the arm 130 with relative travel. The cam 136 has a surface 138 for contacting the roller 137. An arm 139 may mount the cam 136 on the thrust shaft 12 or other travelling and/or stationary support.

A like arm 140 is pivotally mounted on the housing 80 such as on a hinge pin 141. The arm 140 has a boss 142 in engagement with a thrust pin 143 having an inner end bearing against the plate 105 which supports the solenoid coil 103. A spring, not shown, is disposed relative to the arm 140 and the boss 142 to properly position the arm 140 and hold the boss 142 in engagement with the thrust pin 143. A cam 146 may be positioned adjacent to a roller 147 on the end of the arm 140 during relative travel therebetween. The cam 146 has a surface 148 for contacting the roller 147. An arm 149 may mount the cam 146 on the thrust shaft 12.

It is to be understood in some uses of the device that the case 10 is stationary while in other uses of the device the shaft 12 is stationary. It will be further understood when the one is axially stationary that the other travels axially relative thereto when the balls are disposed at a helical angle relative to the thrust shaft 12.

The cam supporting arms 139 and 149 may be mounted by a suitable fixture on the thrust shaft 12 for travel therewith when the case 10 is anchored stationary. Conversely, the arms 139 and 149 may be mounted on the case 10 when the thrust shaft is anchored axially stationary and when the case 10 is travelling axially relative to the thrust shaft 12. As shown in FIG. 5, they are mounted on the thrust shaft 12.

The arm 139 may be attached to the right end of the thrust shaft 12 so that, as it moves to the left, the cam 136 will actuate the arm 130 at the end of left travel of the thrust shaft 12 to act on solenoid 102.

The arm 149 may be attached to the left end of the thrust shaft 12 so that as it moves to the right, the cam 146 will actuate the arm 140 at the end of thrust shaft 12 right travel to act on the solenoid 103.

As shown, the arm 139, cam 136, and roller 137 lie in one plane. The arm 149, cam 146, and roller 147 lie in another plane. This avoids interference between a cam and an opposite arm 130 or 140. The cams and arms are shown diagramatically so that their true position is not indicated. Their true position is normally a greater distance apart than shown. Each arm is shown diagramatically adjacent the roller it actuates for the purpose of illustration. Actually when one cam is adjacent its roller, the other cam would be a distance away from its roller for the purposes of explanation.

A reversing switch may be used also so that upon connecting one solenoid coil in a circuit the other is automatically cut out of the circuit. Means may be used to automatically actuate the switch at the end of travel or at any other desired point.

Axial movement to the left of the thrust shaft 12 is effected when the solenoid coil 102 is energized. When the coil 102 is energized the armature 118 is in the dotted line indicated position of FIG. 3. This swings the crosshead 100 to actuate the linkage and mechanism to helically dispose the balls 11 relative to the thrust shaft 12 to move the thrust shaft 12 to the left.

As the thrust shaft 12 travels to the left it carries the arm 139 and cam 136 to the left until the cam surface 138 engages the roller 137 on the arm 130. Further movement to the left carries the cam 136 with the cam surface 138 riding the roller 137 swinging the arm 130 inwardly towards the housing 80. This causes the boss 132 to push the thrust pin 133 into the housing 80. The thrust pin 133 pushes against the plate 104, sleeve 113, bushing 114, and spring 122. The spring therefore allows the plate 104 to travel with the inward movement of the pin 133. The travel of the plate 104 moves the energized coil 120 and armature 118 from the indicated dotted line position of the armature to the solid position of the armature 118. This swings the crosshead 100 from its previously swung angular position back to its shown straight line position. This locates the balls 11 at a zero helix angle relative to the thrust shaft 12 terminating thrust shaft 12 axial travel to the left with the coil 102 still energized.

Axial movement to the right of the thrust shaft 12 is effected when the solenoid coil 103 is energized. When the coil 103 is energized the armature 120 is in the dotted line indicated position of FIG. 3. This swings the crosshead 100 to actuate the linkage and mechanism to helically dispose the balls 11 relative to the thrust shaft 12 to move the thrust shaft to the right.

As the thrust shaft 12 travels to the right it carries the arm 149, and cam 146 to the left until the cam surface 148 engages the roller 147 on the arm 140. Further movement to the left carries the cam 146 with the cam surface 148 riding the roller 147 swinging the arm 140 inwardly towards the housing 80. This causes the boss 142 to push the thrust pin 143 into the housing 80. The thrust pin 143 pushes against the plate 105, sleeve 113, bushing 115, and spring 123. The spring therefore allows the plate 105 to travel with the inward movement of the pin 143. The travel of the plate 105 moves the energized coil 103 and armature 120 from the indicated dotted line position of the armature to the solid position of the armature 120. This swings the crosshead 100 from its previously swung angular position back to its shown straight line position. This locates the balls 11 at a zero helix angle relative to the thrust shaft 12 terminating thrust shaft 12 axial travel to the right with the coil 103 still energized.

As shown and described, the cams 136 and 146 have sufficient cam surface and angle to completely neutralize the travel of an armature 118 or 120 relative to its respective energized coil 102 or 103. However, it will be understood that the cam surface may be shortened and/or the angle lessened so as not to completely neutralize the travel of the armature 118 or 120 but rather to only reduce the travel of the armature 118 or 120. This provides controlled acceleration and controlled deceleration in the device.

Considering this in terms of crosshead 100 angular position, pivot pin 85 pivotal movement, spool 77 and drive shaft 58 axial movement, it can be seen that the rollers 62 and 66 do not travel their full extent in their respective slots 62 and 67. Less than full travel of the rollers 62 and 66 in their respective slots 62 and 67 cams the sleeves 63 and 68 less than their full angular movement with resultant less helical angular movement of the balls 11 relative to the thrust shaft 12. Thus, the balls 11 drive the thrust shaft 12 with less than maximum helical angulation which reduces the axial thrust quantitatively on the thrust shaft 12. This reduces the speed of axial travel of the thrust shaft 12 as compared to its maximum axial travel speed at any given rotational speed.

Thus cams of various size may be used to move the arms 130 and 140 various distances. They may be located at desired positions relative to the thrust shaft 12. In this way the axial speed of the thrust shaft 12 may be controlled at desired locations over desired distances. In this way acceleration and deceleration of thrust shaft axial movement is achieved in conjunction with constant rotational speed.

Referring now to FIG. 6, the device disclosed therein to illustrate the invention comprises a case 210 housing rollable elements such as planet balls 211 frictionally contacting thrust shaft 212 to move the shaft axially in either direction depending on the helix angle therebetween which is controlled by the races 214 and 215 angular relative position as set by helical gears 216 and 217 and mating helical idler gears 218 and 219 fixed on common control shaft 220 which is axially movable and positionable by the annular boss 221 and clevis 222. Axial movement of the control shaft 220 effects camming action between the helical idler gears 218 and 219 and helical gears 216 and 217 causing one helical gear 217 and race 215 to move in one angular direction and the other helical gear 216 and race 214 to move in the opposite angular direction as seen in FIG. 6 to selectively vary the helix angle of the balls 211 relative to the shaft 212 as the balls orbit about the shaft as driven by cam rings 224 and 225 keyed to a ring gear 223 which is driven by a motor, not shown, through a gear train, not shown.

More particularly, the race 215 is keyed to the gear 217 and both are supported by a bearing 230 and a bushing 231 on one end of the case 210 while the race 214 is keyed to the gear 216 and both are supported by a bearing 232 and a hub 233 on the other end of the case 210. The races 214 and 215 respectively carry opposed bearing assemblies 234 and 235 which abut the thrust collars or cam rings 224 and 225 through spacers 236 and 237 respectively. A Bellville washer spring 243 is disposed between the hub 233 and the bearing 232 adjacent thereto so that by screwing the hub inwardly against the fixed opposed bushing 231 at the other end of the case 210, the axial thrust on the cam rings 225 and 224 is increased to develop increased radial thrust on the balls 211 to move them into more forceful frictional contact with the shaft 212.

The ring gear 223, cam rings 224 and 225, and spacers 236 and 237 rotate at ring gear speed while balls 211, pins 239, races 214 and 215, and the helical gears 216 and 217 rotate at orbital speed. The bearing assemblies 234 and 235 and bearings 230 and 232 provide support and relative rotation means for separating the parts which rotate at different speeds. These bearing separations also provide means for angularly varying one race 214 or 215 relative to the other race to adjust, vary, and control the applied helix angle of the pins 239 and balls 211 relative to the thrust shaft 212.

The helical idler gears 218 and 219 are keyed rotationally and axially fixed on the shaft 220 which is axially slidably journalled in the case 210 at 246 and 247 so that the helical idler gears 218 and 219 and control shaft 220 rotate as a unit and move axially as a unit.

The angulation of the helical gears 217 and 219 on one side are opposite and opposed to the gears 216 and 218 on the other side and these are so adjusted to the races 214 and 215 and ball pins 239 to dispose the balls 211 on zero helix angle when the gears 217 and 219 and the gears 216 and 218 meshed on center as shown. The angular teeth on helical gears 216 and 217 constitute opposed rotary cams controlling the relative angular position between the races 214 and 215, which in turn, control the helix angle of the pins 239 and balls 211 relative to the shaft 212. The races 214 and 215 have sockets 249 housing the ends of the pins 239.

Moving the clevis 222 to the right from the position shown, causes the helical idler gears 218 and 219 to move to the right from the position shown causing one helical gear 216 or 217 to angularly move in one direction and the other to angularly move in the opposite direction. This moves the race 214 and race 215 angularly in the opposite directions with the race slots 249 moving angularly oppositely to angulate the pins 239 and balls 211 therebetween on the desired helix angle and direction relative to the shaft 212.

Conversely, moving the clevis 222 to the left from the position shown moves the helical idler gears to the left causing the helical gears 216 and 217 to move angularly opposite to one another in directions opposite to that just described with similar action in the races 214 and 215, slots 249, pins 239, and balls 211 relative to the shaft 212 on the desired opposite helix angle and thrust direction to that just described.

The radially inward camming pressure of the collars or rings 224 and 225 on the balls 211 and thrust shaft 212 is adjustable by turning hub 233 against the Bellville spring washers 243 and the speed of the motor may also be variable, which in conjunction with variable clevis 222 movement, gives a wide range of helix angle amplitude, rotational speed, and forced engagement effecting shaft axial movement.

Moving the clevis 222 over against either stop 250 or 251 effects the maximum helix angle of the balls 211 as applied to the shaft 212; partial movement of the clevis applies less than the full available helix angle. The maximum helix angle is controlled by the helix angle of the teeth on the gears 216 to 219 as designed in building the unit. Movement of the clevis 222 may be effected manually or automatically by servo-mechanisms as desired, such as by a device previously described in conjunction with FIGS. 1–5.

Figure 7:
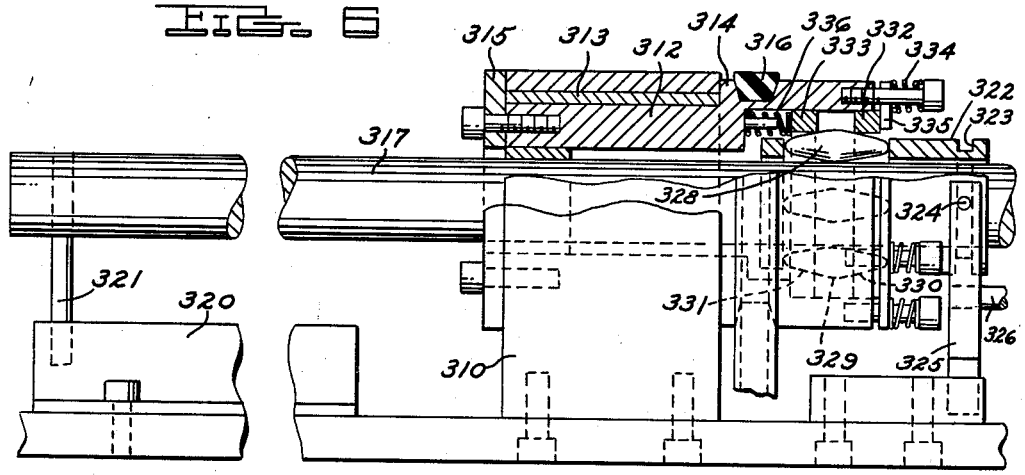
FIG. 7 is a longitudinal cross-sectional view, partly in elevation, of another modified embodiment of the invention.

Referring now to FIG. 7, the rotary motion to lineal motion converter device shown therein comprises an axially movable rotationally secured first member having an annular surface, an axially secured rotationally movable second member having an annular surface with the members annular surfaces being concentrically disposed about an axis in spaced relationship to one another. Spaced opposed camming rings are disposed on and rotate with the second rotatable member and rollable elements such as rollers are disposed between the camming rings and the first axially movable member with the rollers having a central contact portion contacting the first member annular surface. The rollers have paired opposed tapered cam portions riding the camming rings with the camming rings axially exerting force thereagainst to cam the rollers toward the first member to force the roller central contact portion into frictional engagement therewith.

A sleeve race endwise and circumferentially contains and locates the rollers. The rollers and sleeve race planetwise rotate between the members with the rollers' axis normally lying parallel to the members' axis and with the plane of the roller central contact portion at a right angle to said members' axis defining a zero helix angle to the first member annular surface so that planetwise rotation of the rollers when axially parallel to the members' axis exerts no axial thrust. Means are provided for exerting axial force on the sleeve race to axially urge the rollers against one of the camming rings to increase the force therebetween to bias the rollers to throw their axis out of parallel with the members' axis to position the plane of said rollers' central portion at a helical angle relative to the first axially movable member to effect axial thrust on the first member as the rollers rotate relative thereto.

More particularly, in the FIG. 7 embodiment of the invention, a housing 310 supported on a base 311 rotatably journals a hollow hub 312 via bearing 313 which hub is held against axial movement by a hub shoulder 314 and a housing end plate 315 which is rotationally driven by a V-belt 316. A shaft 317 lies concentric within the hub 312 and is held against rotation by the track guides 320 and a pin 321. A sleeve race 322 freely surrounds the shaft 317 within the hub 312 and is moved axially of shaft and hub through a circumferential groove 323, a pin 324, a yoke 325, and a push-pull rod 326. The sleeve race 322 has roller sockets and rollers 328 are disposed therein in circumferential and endwise caged abutting condition with the rollers each having a large central compound curved contact portion 329 having a spherical or arcuate face making point contact with the peripheral surface of the shaft 317; the sleeve race 322 is rotationally free to turn with rollers as they roll in a planetary orbit about the shaft 317. The rollers 328 have opposed cam portions 330 and 331 on either side of the central portion 329 tapering endwise outwardly constituting opposed cam surfaces.

Paired, opposed camming rings 332 and 333 surround the roller cam portions 330 and 331 respectively radially confining the rollers in the sleeve race sockets 327 and urging the rollers 328 radially against the shaft 317. The camming rings 332 and 333 are located and driven by hub 312 contact and are urged axially toward one another by the springs 334 and plate 335 on one axial side and by the springs 336 on the other axial side. Hub 312 rotation is transferred to the rollers 328 by the rings 332 and 333 causing the rollers to roll in a planetary orbit about the rotationally stationary shaft 317 with the sleeve race 322 rotating at the orbital speed.

When no rotation is occurring among the parts, the rollers 328 with their axis at an angle to the shaft axis in the drive position or with their axis parallel relative to the shaft axis at the null position lock the shaft against axial movement as the rollers are locked against axial movement by the cam rings.

When rotation is occurring among the parts with the rollers' axis parallel to the shaft axis, the null position obtains and the rollers' line of point contact is described on the shaft surface circumferentially or at zero helix angle locking the shaft against axial movement and neutralizing or nullifying axial thrust from the rollers to the shaft.

When rotation is occurring among the parts with the rollers' axis at an angle to the shaft axis, the drive condition obtains and the rollers contact portion 329 line of contact is described helically on the shaft surface at more than a zero helix angle producing an axial thrust between the rollers and the shaft causing the shaft to move axially on the helix angle of the roller compound curved central portion line of contact with the shaft surface as the rollers are blocked against axial movement by the rings and hub. With the roller line of contact angularly on one side of zero, the shaft is thrust in one axial direction and with the roller line of contact angularly on the other side of zero the shaft is thrust in the other direction.

To effect the drive condition in one direction, with the hub rotating counter clockwise, the rod 326 is pushed to the left moving the sleeve race 322 to the left and pushing the rollers 328 to the left increasing the pressure between the roller cam surface 331 and the camming ring 332 at the left and decreasing pressure between the roller cam surface 330 and the camming ring 332 at the right causing the left cam 331 to nose under and angularly cant under the ring 333 at the left and letting the right cam 330 rise and angularly cant at the right ring 332 with the direction of rotation pulling the nosed under left cam 331 forwardly rotationally and letting the risen right cam 330 move rearwardly rotationally thereby angularly disposing the plane of the roller compound curved large center portion 329 line of contact with the surface of the shaft at an angle thereby having each roller line of contact describe a helix relative to the shaft surface on the right side of zero helix angle causing the shaft to move to the left as the applied line of contact of the roller center portion urges the rollers to the right, and since they cannot axially move, the shaft moves axially to the left. Obviously, pull on the rod to the right effects shaft movement in the opposite direction.

The axial spring pressure on the camming rings 332 and 333 is variable as shown but may be non-variable or the springs may be eliminated and the force applied to the camming rings mechanically adjustably or built in fixedly as desired.

Due to the slight slope of the roller tapered cam surfaces 330 and 331 against the camming rings 332–333, relatively low axial pressure on the camming rings produces a high coefficient of friction between the roller surface point contact with the shaft peripheral surface thereby highly augmenting the already high coefficient of friction inherent in point contact. Movement by the sleeve race axially pushing the rollers endwise adds axially directed force to the cam engagement between roller tapered portions and the camming rings increasing the radial thrust of the rollers point contact with the shaft.

By increasing the push or pull force on the rod 326, the angular relationship and force relationship of the rollers 328 relative to the shaft 317 in increased in amplitude and angular disposition causing an increased axial movement of the shaft in the desired direction and obviously this can be augmented as far as speed of axial movement of the shaft is concerned by also increasing the rotational speed of the hub.

The initial compression of the cam rings towards one another develops the initial bearing or contact force between the roller and the shaft and sleeve force biasing or canting the rollers is additive thereto.

Figure 8:
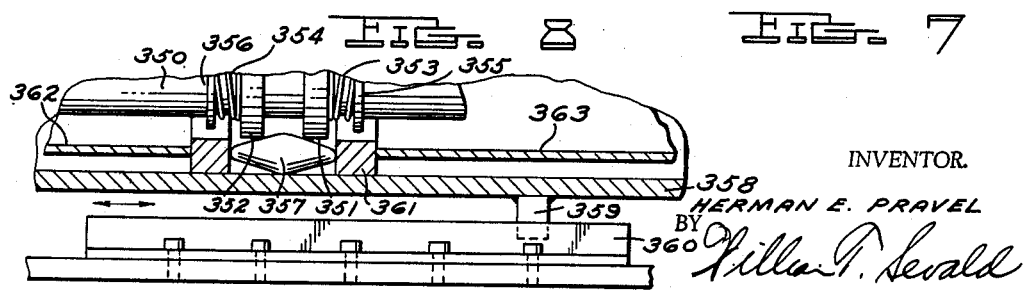
FIG. 8 is a partial cross-sectional view of a further modified embodiment of the invention having an outer axially movable thrust member.

In the embodiment shown in FIG. 8, the shaft 350 is axially secured and rotationally driven and carries the camming rings 351 and 352 which are slidably keyed thereon and urged toward one another by the springs 353 and 354 as abutted by the collars 355 and 356. The camming rings contact the tapered cam portions of the rollers 357 urging them radially outwardly against the hub or cylinder 358 which is axially movable and secured against rotation by the dog 359 travelling in the track 360. The sleeve race 361 is freely disposed between the shaft 350 and hub 358 and has sockets axially and circumferentially caging and locating the rollers 357. The race 361 is urged axially by either one of the thrust tubes 362 and 363 to jam the roller tapered cam portions into increased force contact with the opposite camming ring to cant the rollers at an angle relative to the hub 358 surface to describe a helix angle as hereinbefore described. The operation of the device of FIG. 8 is similar to that of the device of FIG. 7.

Referring now to the embodiment of the invention shown in FIG. 9, a frame 400 supports a cantilevered tubular housing 401. A rotationally stationary axially movable sleeve or tube 402 is sleeved over the housing 401. The tube 402 may be held rotationally stationary by a pin 403 travelling in a track 404 or by the load or work element on the tube 402. Axially stationary rotatably movable rollers or balls 405 engage the inside of the tube 402. Each ball has an axial extension 406 lying in a recess of a race 407 and an axial extension 408 lying in a recess of a race 409. The races 407 and 409 circumferentially locate the rollers or balls 405 and change their helix angle relative to the tube 402 as hereinafter more fully described.

The roller bearings 410 locate the race 407 relative to the sleeve or tube 402 and roller bearings 411 locate the race 409 relative to the tube 402. An extension 412 on the housing 401 lies within the races 407 and 409 and terminates in an end plate 413. Paired cam rings or thrust collars 414 and 415 engage cam surfaces on the balls or rollers 405 and urge the balls or rollers 405 axially outwardly into frictional contact with the tube 402. The race 407 carries an internal ring gear 416. The race 409 carries an internal ring gear 417. A bearing assembly 418 lies between the end plate 413 and the internal ring gear 417. A stationary portion of the bearing assembly 418 engages the end plate 413 while a rotating portion of the bearing assembly 418 engages the ring gear 417 and/ or the race 409.

A bearing assembly 419 lies between the ring gear 417 and the thrust collar 415 with one portion engaging the gear and the other engaging the collar to provide for relative difference in rotation. The thrust collar 415 is thereby held axially stationary by the end plate 413, bearing assembly 418, ring gear 417, and bearing assembly 419 on one side of the balls or rollers 405.

On the other side of the balls or rollers 405, a bearing assembly 420 is positioned between the thrust collar 414 and a ring gear 416 permitting relative rotation therebetween. A bearing assembly 421 is disposed between the ring gear 416 and a spring thrust washer or discular spring 422 abuts a pressure plate 423. Axial pressure is placed against the pressure plate 423 by a plurality of thrust rods 424, such as three, by turning their threaded portions 425 in the frame 400.

Axial pressure exerted by the thrust rods 401 against the pressure plate 423 is communicated through the discular spring 422 to the stationary portion of the bearing assembly 421. This axial thrust is transferred from the stationary portion of the bearing assembly 421 to its rotating portion and then to the internal ring gear 416 and/or the race 407. The axial thrust against the ring gear 416 and the race 407 is transferred to the bearing assembly 420 and then to the thrust collar 414.

It can now be understood that the thrust collar 415 remains stationary and the thrust collar 414 is urged axially towards the thrust collar 415. Both thrust collars bear against the cam portions on the balls or rollers 405. This urges the balls or rollers 405 radially outwardly into frictional engagement with the inner periphery of the axially movable tube 402. The balls or rollers have a crowned central portion which frictionally engages the internal periphery of the tube 402.

The gear 432 is keyed to a sleeve 433. A web 434 lies within the housing 401 and supports bearing races 435 and 436. The bearing race 435 supports the sleeve 433. The bearing race 436 supports the drive shaft 430. The sleeve 433 has at least one axial slot 437 and a pin 438 has opposite ends lying in the sleeve slots 437. The end of the pins may be equipped with antifrictional rollers 439 for engaging the slot side walls. The pin 438 is fixed in the control shaft 440 which extends from the control mechanism 441 at the frame 400 to a point adjacent the end plate 413. By operation of the control mechanism 441 the control shaft 440 is moved axially with the pin 438 moving in the slots 437.

Drive from the drive shaft 430 is communicated through the gear 431 to the gear 432. The gear 432 transmits rotation to the sleeve 433 via key connection, not shown. The rotation of the sleeve 433 is communicated to the control shaft 440 by the pin 438.

The control shaft 440 also carries radially extending pins 442 and 443 in the area of the internal ring gears 416 and 417 respectively. A sleeve 444 has at least one helical slot 445 engaging the ends of the pins 442. The sleeve 444 is keyed to the ring gear 416.

The pin 443 has radially extending ends lying in at least one helical slot 446 of a sleeve 447 which is keyed to the internal ring gear 417. The slot 446 is helically angled oppositely to the slot 445. The sleeve 447 is supported by a bearing assembly 448 in the end plate 413. A spacer sleeve 449 lies intermediate the sleeves 444 and 447. Antifriction bearing assembly 450 lies between the sleeves 443 and 444. An antifriction bearing assembly 451 lies between the sleeves 444 and 449. An antifriction bearing assembly 452 lies between the sleeves 449 and 447. Bushings 453—458 surround the shaft 440 in the area of the sleeves controlling concentric alignment of the control shaft 440 and the various sleeves adjacent the various bushings.

The balls or rollers 405 are shown at a zero helix angle relative to the tube 402. By angularly moving one race 407 relative to the other race 409 the helix angle of the balls or rollers 405 may be changed relative to the tube 402.

In the embodiment shown in FIG. 9, both races 407 and 409 are moved angularly oppositely to one another to move the radial tips 406 and 408 on the balls or rollers 405 in opposite angular directions to change the helix angle of the balls or rollers 405 relative to the tube 402. The angular movement of the races 407 and 409 relative to one another is effected by axial movement of the control shaft 440.

Axial movement of the control shaft 440 to the left as seen in FIG. 9, moves the pins 442 and 443 axially relative to their oppositely angled helical slots 445 and 446. This moves the sleeve 444, ring gear 416, and race 407 in one angular direction and moves the sleeve 447, ring gear 417, and race 409 in the opposite angular direction. This moves the radial tips 406 and 408 on the balls 405 in opposite angular directions changing the helix angle of the balls 405 relative to the tube 402.

Axial movement to the right of control shaft 440 moves the pins 442 and 443 to the right relative to the oppositely angled helical slots 445 and 446. This moves the sleeve 444, ring gear 416 and race 407 in the opposite angular direction to that previously described. It also moves the sleeve 447, ring gear 417, and race 409 in the direction opposite to that previously described. This disposes the balls or rollers 405 at a helical angle relative to the tube 402 opposite to that previously described.

It will be understood that the drive shaft 430 and the control shaft 440 are rotating during the operation of the device and that the control means 441 is optionally selective to move the control shaft 440 axially as desired. In the position shown, the balls or rollers 405 are disposed at zero helix angle relative to the tube 402 so that no axial movement of the tube 402 occurs in conjunction with relative rotation of the balls or rollers 405 relative to the tube 402.

It will be further understood that the rotation of the drive shaft 430 is communicated through the gears 431 and 432 to the sleeve 433, pin 438, and control shaft 440. The rotational drive of the control shaft 440 is communicated to the balls 405 on one side through the pin 442, sleeve 444, ring gear 416, race 407 and the tip 406 on the ball or roller. Rotational drive of the control shaft 440 is communicated to the other side of the balls or rollers 405 through the pin 443, sleeve 452, ring gear 417, race 409, and radial tip 408 on the ball 405. The balls orbit around inside the tube 402 with the thrust collars 414 and 415 travelling at a rotational speed equivalent to the peripheral speed of the balls or rollers 405.

In the operation of the device seen in FIG. 9, moving the control shaft 440 to the right by the control means 441 disposes the balls or rollers at a right helical angle relative to the tube 402 which, in conjunction with relative rotation therebetween, moves the tube 402 axially outwardly to the left as seen in FIG. 9.

Movement of the control means 441 to the left as seen in FIG. 9, disposes the balls or rollers 405 in a left helical angle relative to the tube 402, which in conjunction with relative rotational movement therebetween, causes the tube 402 to move axially to the right as seen in FIG. 9.

The control means 441 may be the same as previously described in conjunction with the device seen in FIG. 5, or it may be manually controlled or automatically controlled as desired.

An outer end plate 460 may be disposed on the tube 402 and outer external bearings, not shown, disposed thereon for supporting the tube 402 in an extended position under extremely heavy loads if desired. A seal 461 lies disposed between the tube 402 and the housing 401; the interior of the tube in the area of the operating mechanism is filled with oil or cooling lubricant.

The various devices of the invention disclosed and described provide easily controllable means effecting axial movement from rotational movement without need of accessory equipment such as found in hydraulic and pneumatic systems.

The various embodiments of the invention may be integrated in design singly or in combination with one another. In all embodiments one member is shown and described as angularly rotatable and axially fixed while the other member is shown and described as angularly fixed and axially movable. Obviously in all embodiments, the angularly rotatable member may move axially while the angularly fixed member may stand axially fixed. This is merely a reversal of function and result and within the pervue of the invention and the scope of the appended claims.

While only a few embodiments of the invention have been disclosed and described in detail, it is obvious that many changes may be made in the size, shape, detail, and arrangements of the various elements of the invention within the scope of the appended claims.

I claim:

1. In a device for mechanically converting rotational movement of one member to lineal movement in another member comprising a first member and a second member;
   said members being disposed about a common axis;
   one said member being axially stationary and the other said member being axially movable;

one said member being rotationally stationary and the other said member being rotationally movable;
rollable elements disposed adjacent one said member and rotated by said other member;
said rollable elements having a central portion in contact with said one member and having cam portions on either side of said central portion;
opposed camming rings disposed in contact with said rollable elements' cam portions,
and means loading said camming rings in forced contact with said rollable elements' cam portions urging said rollable elements toward said one member urging said rollable elements' central portion into forced contact with said one member.

2. In a device as set forth in claim 1,
means circumferentially positioning said rollable elements relative to said camming rings and said one member.

3. In a device as set forth in claim 1,
means for rolling said rolling elements relative to said camming rings and rotationally stationary member driven by said rotationally movable member.

4. In a device as set forth in claim 3;
said rollable elements' central portion being normally disposed at zero helix angle relative to said one member;
and means for changing the helical angulation of said rollable elements' central portion to a helical angle greater than zero relative to said one member to develop axial thrust therebetween in conjunction with the rolling of said rollable elements by said rotatably movable member.

5. In a device for mechanically converting rotational movement of one member to lineal movement in another member including a first member and a second member;
said members being disposed about a common axis;
one said member being axially stationary and the other said member being axially movable;
one said member being rotatably stationary and the other rotatably movable;
rollable elements disposed adjacent one said member;
said elements having a large central portion in contact with said one member and having cam portions on either side of said large central portion,
means bearing on said rollable elements' cam portions urging said rollable elements' large central portion into engagement with said one member;
said rollable elements having axial projections;
and opposed races having means housing said rollable elements' axial projections circumferentially locating said rollable elements.

6. In a device as set forth in claim 5,
said races normally positioning said rollable elements' large central portion at zero helix angle relative to said one member;
means for angularly varying at least one said race relative to the other to dispose said rollable elements' large central portion at a helical angle greater than zero relative to said one member to develop axial thrust between said axially movable member and said axially stationary member in conjunction with the rolling of said rollable elements relative to said axially movable member,
and means imparting rolling motion to said rollable elements driven by the rotational movement of said rotatable member.

7. In a device for mechanically converting rotational movement of one member to lineal movement in another member including a first member and a second member;
said members being disposed about a common axis;
one said member being axially stationary and the other said member being axially movable;
one said member being rotatably movable and the other rotatably stationary;
rollable elements disposed adjacent to and in forced contact with one said member;
said rollable elements having axial projections;
and opposed races having means housing said rollable elements' axial projections circumferentially locating said rollable elements;
said races normally positioning said rollable elements at zero helix angle relative to said one member;
means for angularly varying at least one said race relative to the other to dispose said rollable elements at a helical angle greater than zero relative to said one member to develop axial thrust between said axially movable member and said axially stationary member in conjunction with the rolling of said rollable elements relative to said one member, and means imparting rolling motion to said rollable elements driven by the rotational movement of said rotable member.

8. A device for mechanically converting rotational movement of a member to lineal movement in another member comprising a cylindrical member such as a shaft and a tube,
paired races having opposed sockets lying concentrically relative to said cylindrical member;
one said member and races being axially movable and the other rotationally stationary;
one said member and races being axially stationary and the other rotationally movable;
means supporting said member and races,
rollable elements such as balls and rollers disposed between said races having a large central portion bearing on said member and smaller end portions lying in said race sockets;
said rollable elements having cam surfaces on either side of their large central portion;
paired opposed camming rings engaging said rollable elements' cam surfaces,
means for urging said camming rings toward one another against said rollable elements' cam surfaces urging said rollable elements' large central portion into frictional contact with said member,
means for rotationally driving one said member and races, and
means for selectively angularly varying one said race relative to the other said race to locate said rollable elements' large central portion at zero helix angle and at helix angles greater than zero on both sides of a zero helix angle to develop axial thrust between said member and said rollable elements and said races in conjunction with rotational movement of one said member and said races.

9. In a device as set forth in claim 8,
said means for selectively angularly varying one said race relative to the other said race comprising
a first gear on each said race,
a second gear meshing with each said first gear,
means forming a helical slot at each said second gear,
a radial pin extending into each said second gear helical slot,
a control shaft lying in said second gears supporting said pins;
said helical slots in said second gears being angled oppositely relative to one another;
one said control shaft and said second gears and slots being axially stationary,
and the other being axially movable;
and means for selectively moving one said control shaft and said pins and said gears and helical slots relative to one another;
relative axial movement of said shaft and pins in one direction relative to said helical slots camming said second gears oppositely angularly relative to one another;
relative axial movement of said shaft and pins in the other direction relative to said helical slots camming said second gears reversely oppositely angularly relative to one another;
said second gears angular movement being transmitted to said first gears on said races to move said races angularly relative to one another to helically angularly vary said rollable elements relative to said cylindrical member.

10. In a device as set forth in claim 9,
said means for selectively moving said control shaft axially comprising,
a spool on said control shaft having paired opposed flanges,
paired crank pins oppositely engaging said flanges, crank arms holding said pins, a connecting rod between said crank arms,
pivot pins fixed on and supporting said crank arms,
a crosshead having opposite ends on one said pivot pin;
and means for angularly varying said crosshead to pivot said one pivot pin and swing said crank arms and pins against said spool flanges to move said spool and control shaft axially.

11. In a device as set forth in claim 10,
said means for angularly moving said crosshead angularly comprising,
a link on each said crosshead opposite end,
an armature connected to each said link,
a coil surrounding each said armature;
said armature primarily travelling toward said coil to move said crosshead angularly;
separate means supporting each said coil for secondary travel toward and away from each said armature, and a compressible spring urging each said separate means and coils away from each said armature and allowing secondary travel toward said armature through compressing said spring;
energization of one said coil at one said armature primarily drawing said one armature toward said coil and secondarily moving said coil toward said armature against said spring at said coil on one hand and against said crosshead end on said armature on the other hand with said spring thereby resiliently angularly turning said crosshead thereby providing a primary positive movement between said coil and said armature and a secondary movement of both coil and armature under resilient spring pressure providing a period of time for said crosshead to move angularly to actuate linkage and mechanism connected thereto.

12. In a device as set forth in claim 11,
a push means at each said separate means for moving said separate means against said spring to move said coil towards said armature to reversely overtravel said armature movement toward said coil to angularly move said crosshead in a direction angularly reverse to that caused by said armature travel;
said push means being capable of effecting selective reverse overtravel to partially and fully reversely overtravel armature travel.

13. In a device as set forth in claim 12,
said push means comprises a push pin,
an arm moving said push pin against said separate means,
and a cam travelling relative to said arm adapted to swing said arm to move said push pin against said separate means a selected distance.

14. A device for mechanically converting rotational movement of a member to lineal movement in another member comprising a cylindrical member,
paired races having opposed sockets lying concentric relative to said cylindrical member,
one said member and races being axially movable and the other being rotationally stationary;
one said member and races being axially stationary and the other rotationally movable;
means supporting said member and races,
rollable elements disposed between said races having a central portion bearing on said member and end portions lying in said race sockets;
said rollable elements' central portion being in loaded frictional contact with said member;
means for rotationally driving one said member and races;
means for holding one said member and races axially stationary; and
means for selectively angularly varying at least one said race relative to the other said race to locate said rollable elements' central portion at zero helix angle and at helix angles greater than zero on both sides of a zero helix angle to develop axial thrust between said member and said rollable elements and said races in conjunction with rotational movement of one said member and said races.

15. In a device as set forth in claim 14,
said means for selectively angularly varying at least one said race relative to the other said race comprising
a first gear on at least one said race,
a second gear meshing with each said first gear,
a control shaft lying in at least one said second gear,
angular camming means lying between said control shaft and each said second gear for moving each said second gear, first gear, and race relative to said other race;
at least one said second gear and said control shaft being axially movable relative to the other to actuate said camming means;
and means for selectively moving one said control shaft and at least one said second gear axially relative to one another,
axial movement of said control shaft in one direction relative to at least one said second gear camming said second gear angularly in one direction,
relative axial movement of said control shaft in the other direction relative to at least one said second gear camming said second gear reversely angularly in the other direction,
said second gear angular movement being transmitted to said first gear on one said race to move said race angularly relative to the other said race to helically angularly vary said rollable elements relative to said cylindrical member.

16. In a device as set forth in claim 15, said means for selectively moving one said control shaft and at least one second gear axially comprising at least one radial flange on one said control shaft and second gear,
at least one crank pin engaging said flange,
a crank arm holding said pin,
a pivot pin fixed on and supporting said crank arm,
a crosshead such as a lever on one said pivot pin;
and means for angularly varying said crosshead to pivot said pivot pin and swing said crank arm and crank pin against said flange to move said flange and one said shaft and second gear axially relative to one another.

17. In a device as set forth in claim 16,
said means for angularly moving said crosshead angularly comprising,
a link on at least one end of said crosshead,
an armature connected to said link,
a coil surrounding said armature;
said armature primarily travelling toward said coil to move said crosshead angularly;
travel means supporting said coil for secondary travel toward and away from said armature, and a compressible spring urging said travel means and coil away from said armature and allowing resilient secondary travel toward said armature;
energization of said coil at said armature primarily drawing said armature toward said coil and secondarily resiliently moving said coil toward said armature against said spring at said coil on the one hand and against said crosshead end on said armature on the other hand with said spring thereby resiliently angularly turning said crosshead thereby providing a primary positive movement and a secondary constant resilient pressure and a period of time for said crosshead to move angularly to actuate linkage and mechanism connected thereto.

18. In a device as set forth in claim 17, a push means at said travel means for moving said travel means against said spring thereat to move said coil thereon towards said armature to secondarily resiliently reversely overtravel said armature primary movement toward said coil normally angularly moving said crosshead when said coil is energized to secondarily angularly move said crosshead in a direction angularly reverse to said armature primary travel;

said push means being capable of effecting selective secondary travel to partially and fully secondarily reversely overtravel armature primary travel.

19. In a device as set forth in claim 18, said push means comprises a push pin, an arm moving said push pin against said travel means, and a cam travelling such with said axially moving member adapted to swing said arm to travel said push pin against said separate means a selected reverse travel distance.

References Cited in the file of this patent

UNITED STATES PATENTS

| | | |
|---|---|---|
| 2,304,477 | Rosen | Dec. 8, 1942 |
| 2,852,947 | Klinger | Sept. 23, 1958 |